Nov. 3, 1959 — O. J. MUNZ — 2,911,538
LINEAR MOTOR CONTROL
Filed Jan. 23, 1956 — 6 Sheets-Sheet 4

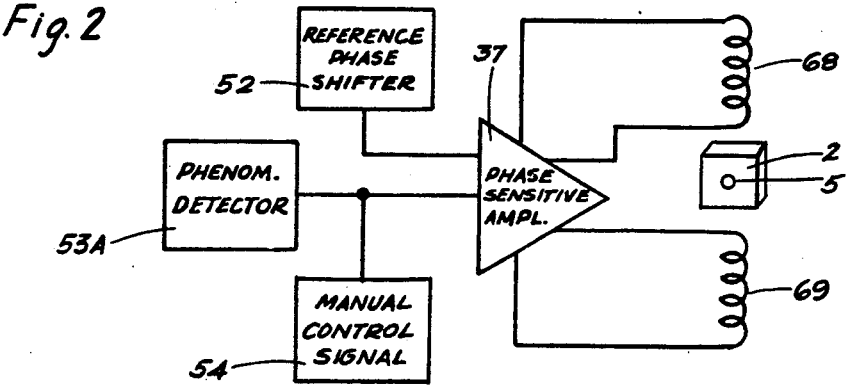
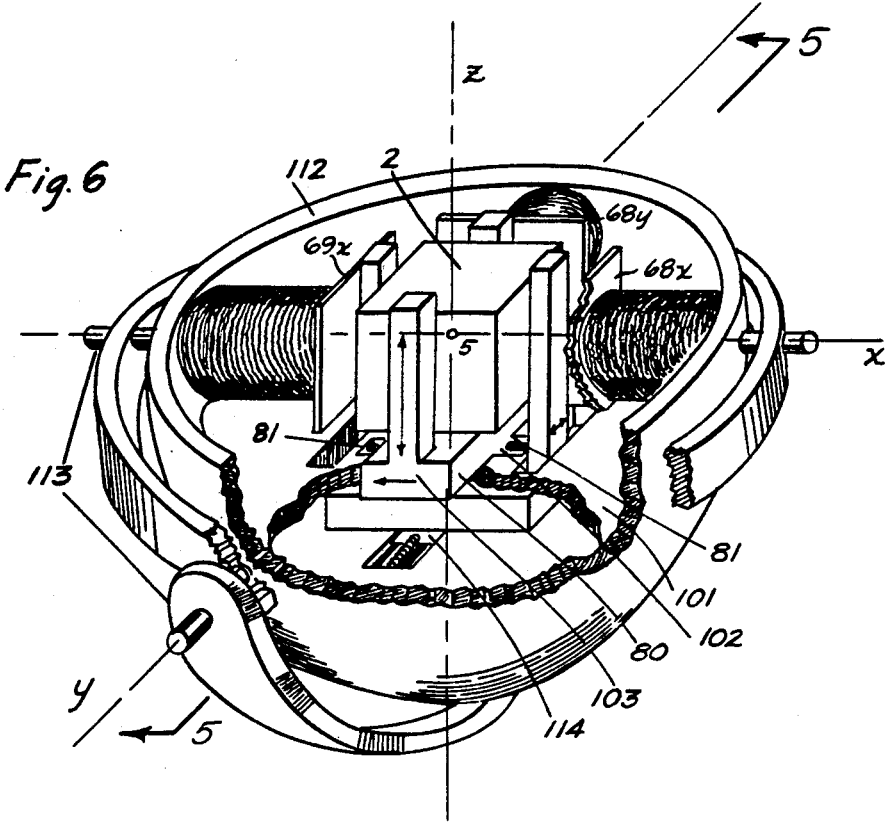

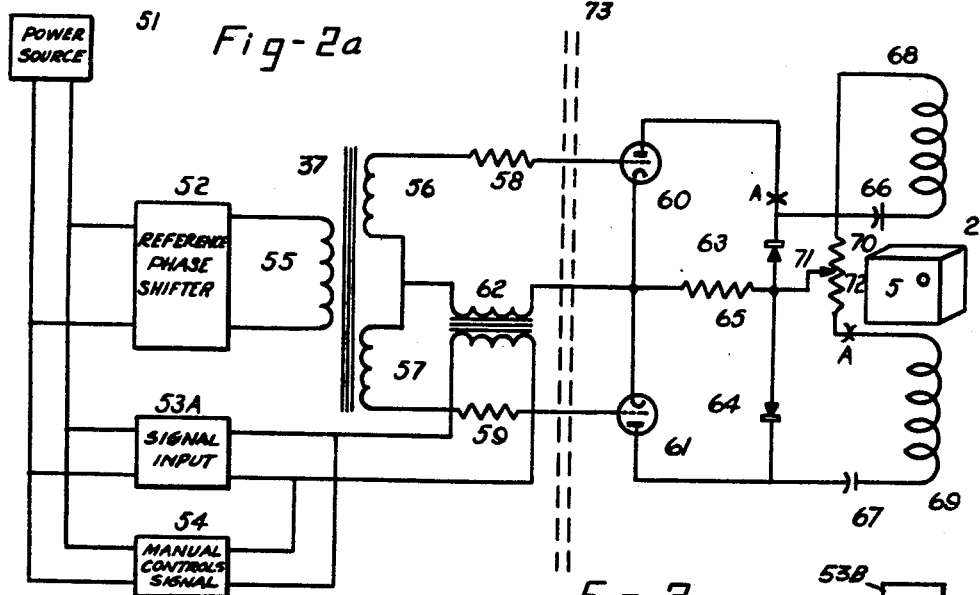
Fig-2a
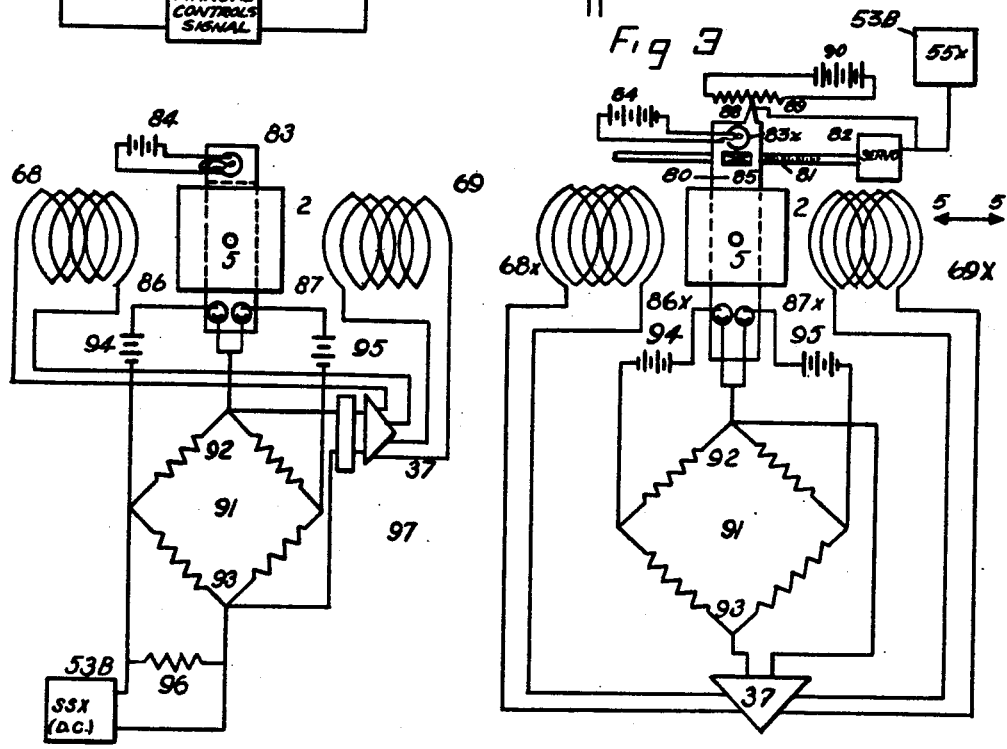
Fig 3
Fig 4
INVENTOR
Otto John Munz

INVENTOR
Otto John Munz

United States Patent Office 2,911,538
Patented Nov. 3, 1959

2,911,538

LINEAR MOTOR CONTROL

Otto John Munz, Annapolis, Md.

Application January 23, 1956, Serial No. 560,847

22 Claims. (Cl. 250—204)

The invention deals with a linear movement electric motor system having means causing a levitating body to move in a defined space in a three-coordinate system in substantially linear paths, a sequence of linear paths, a curved or tortuous path, a path closed upon itself, or universally.

For the purposes of this invention a glyph is a three-dimensional configuration produced within a matrix representing in three-dimensional proportions three-dimensional relationships.

An object of the present invention is to provide a method and apparatus for electromagnetically suspending and for moving a body relative to and within a space determined by and limited to a volume between electromagnetic coils in which the force-field effectively provides controllable stabilizing and/or positioning forces on said body in one, two or three dimensions. This method and apparatus may be utilized for purposes of suspending and/or moving freely suspended variegated bodies such as indicating, displaying or recording valves, styli, fluid stirring or other bodies, hereinafter defined generally as bodies or armatures, in a container or other spaces defined by the effective range of the electro-magnetic control fields employed. To further illustrate the possibilities of this invention, the method and apparatus herein disclosed for instance may be utilized for suspending and/or controllably moving and positioning a medical capsule, such as a chemical or radioactive material, or a cauterizing instrument in the human body to controllably operate there.

Another object of the present invention is to provide a method of and apparatus for display of information such as values of mathematical functions or relative positions of physical objects in a transient form in three dimensions by the instantaneous positioning of a body relative to three servo-root plotter orthogonal reference axes. Examples of this object are a two or three dimensional radar indicator, an optical scanner, a visible analog mathematical function indicator, a servo-root-locus plotter, etc.

Yet another object of the present invention is to provide a recording method in a manner enabling the reading of the components of the glyph information in three dimensions by incorporating fiduciary marks, grids, references, graduations or other units significant of the objects displayed or represented.

Another object of the invention is to add to the above glyph display indicia of still another function, the units of which are representative of a fourth dimension such as of time or of other variables, which may be time or position dependent. The addition of a fourth variable to the three-dimensional display allows indication of functions of four variables such as the space-time equations of the Einstein special relativity theory.

Other objects of the invention will become clear from the following detailed description and accompanying drawings.

In the drawings:

Fig. 2 is a schematic circuit diagram of a non-follow-up armature control circuit.

Fig. 2a is a schematic circuit diagram of one amplifier feeding two opposed coil-fields for one representative axis of the armature movements within the apparatus shown in Fig. 6.

Fig. 3 is a schematic diagram of an armature position control circuit of the apparatus shown in Fig. 6.

Fig. 4 is a schematic diagram of an all-electronic alternative embodiment of a armature position control circuit of the apparatus shown in Fig. 6.

Fig. 6 is a perspective view of the apparatus of Fig. 5 with portions broken off.

Figure 1:
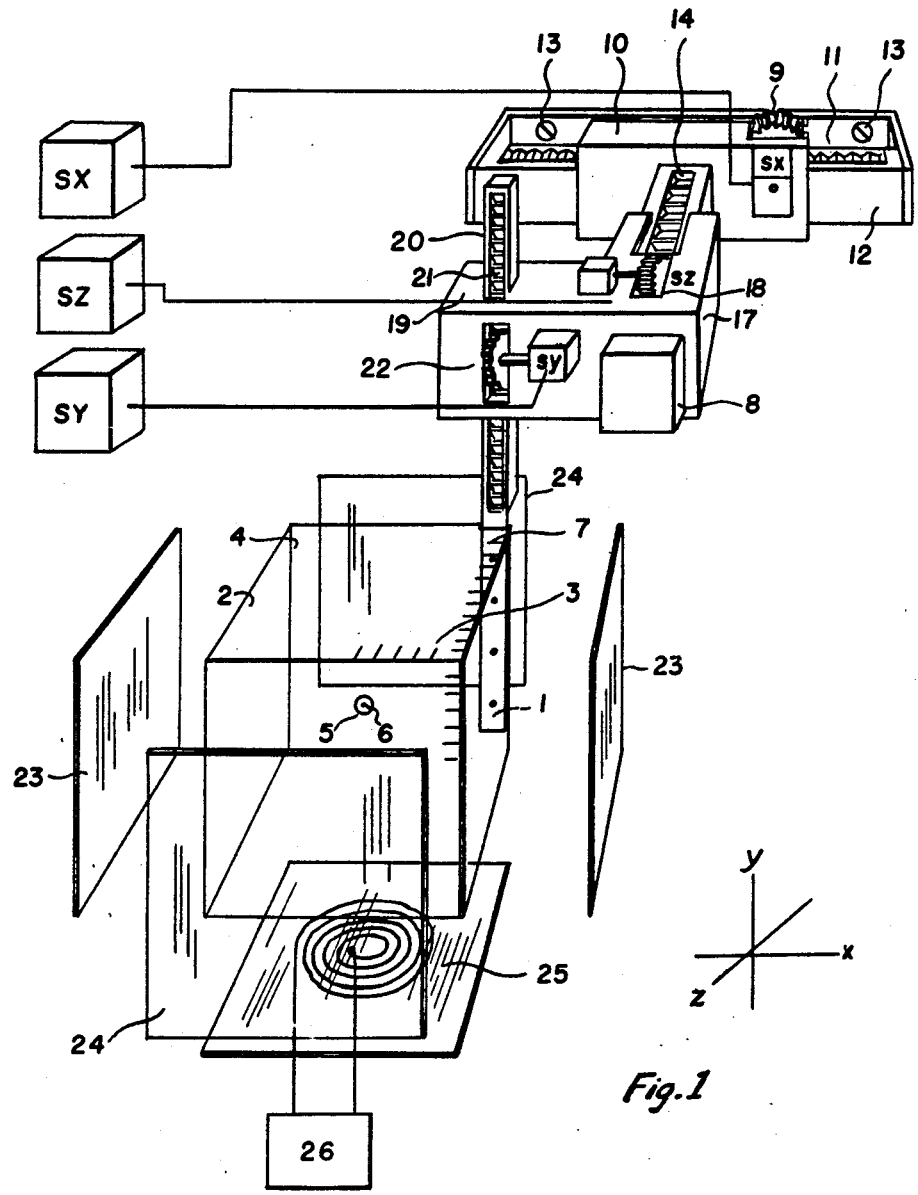
Fig. 1 is a perspective view of a glyph recording apparatus in a simple embodiment.

In Fig. 1 the numeral 1 depicts a glyph-matrix housing within which may be removably inserted the glyph-container 2, which is preferably transparent and equipped with a frame of references 3, in three dimensions representative of the phenomena recorded. For example, these references may be Cartesian and /or polar coordinates, they may designate the compass directions, in accordance to predetermined reference points, or these references may represent mathematical or other values selected to correspond to the phenomena recorded.

The glyph-container 2 may be filled with a glyph supporting fluid 4, hereinafter called glyph-carrier such as a transparent polymerizing plastic, or a fluorescent or phosphorescent gas.

The glyph-matrix housing is suspended for universal movements in three dimensions by holding means 7. While movements only along the Cartesian coordinates are shown, alternative movements along the polar coordinates or in combination with the first-mentioned movements or movements along any other coordinate system come within the scope of this invention. These movements are produced by motion controls generally indicated as 8. In the three orthogonal axes control, movement is controlled along the X axis by a servo-motor, not illustrated, which drives a gear 9 rotatably mounted in housing 10 to engage rack 11 on carriage 12, which is fixed by screws 13 to a fixed point, not shown, such as the frame of the apparatus, or a gymbal system, a vehicle, aircraft, rocket, submarine, etc.

Carriage 12 slides through hollow housing 10 and is gear-driven along the X axis by the servo-motor. Attached to housing 10, perpendicular thereto, is a carriage 15 slidably mounted within a housing 17 for movement along the Z axis of the system carrying a servo-motor. A gear 18, rotatably supported in housing 17 and driven by a servo-motor, not illustrated, engages a rack gear 14 secured to the carriage 15. Housing 17 is illustrated as having an extension 19 at a 90° angle to the Z axis and parallel to the X axis. The extension 19 houses carriage 20 with rack 21 for vertically sliding movements within extension 19 along the Y axis of the system. On housing 19 is mounted a servo-motor, not illustrated, which drives a gear 22 that engages rack 21 to produce vertical movements of carriage 20. Carriage 20 extends into the already mentioned holding means 7 of the glyph container housing 2. The gears 9, 18 and 22 are reversibly driven by their respective servo-motors, each sliding within its housing back and forth along its own axis in response to its respective signal source SX, SZ and SY.

The signal sources may be phenomena detectors such as potentiometers, differential transformers, or any other signal generators, or transducers.

The armature 5 comprises an electro-conductive material and is suspended within the glyph-container, for instance by magnetic, electro-static or electro-magnetic forces, or by being made buoyant in a cooperative fluid in the container.

In Fig. 1 suspension by electro-magnetic means is shown.

Two pairs of coils 23 and 24 are provided for positioning the armature 5 in the two coordinate horizontal directions. The coils of each pair 23 and 24 are arranged on opposite sides of the container and each pair of coils is aligned along a common horizontal axis. Electrically the coils of each pair 23 and 24 are connected in series across a source of alternating current and are oppositely wound to effect a non-uniform field throughout the container so that at any given instant these coils produce at their adjacent ends magnetic fields of like polarity. The magnetic field produced by each coil extends in a curved path about the outer circumference and axially of the coils between the two ends thereof. The field of each coil extends into the enclosure but since like magnetic fields cannot cross or intersect one another a region of no field or a null region is established between the coils 23 and between the coils 24. A conductive armature 5 positioned in this null region has its outer edges closest to the coils of each pair 23 and 24 respectively linked by weak alternating fields of like polarity. Each alternating field induces a current in the armature 5 which tends to repel the armature 5 from the inducing field. The currents induced by the fields produced by coils 23 and 24 in the armature 5 are oppositely directed and if the armature is subjected to fields of equal intensity the net current is zero and no net force is exerted on the armature. If the armature 5 tends to shift toward one of the coils 23 or 24, it proceeds into a region where one field is more intense than the other and a net force is developed which returns the armature to the null region. As a result, the pairs of coils 23 and 24 maintain the armature by repulsion in a fixed position in two coordinate directions. The pair of coils 23 is positioned along an axis perpendicular to the axis of the pair of coils 24 and the two pairs of coils serve to maintain the armature 5 in a fixed position in two coordinate directions. A coil 25 is positioned below the glyph container 1 and is energized from a source of alternating current 26. The current through the coil 25 is of such a magnitude that the repelling force acting on the armature 5 is sufficient to counterbalance the force of gravity acting thereon and the armature 5 is thereby suspended in space. As a results of the action of the coils 23 through 25, the armature 5 is maintained in a fixed position in space within the glyph housing 2 and its position is independent of movement of the glyph container in response to servo-motors 9, 18 and/or 22.

While in Fig. 1 the function of the coils is to hold the armature fixed in space, in Fig. 2 and in the following figures the coils move the armature relative to a stationary container; the coils and the container being fixed relative to each other.

Referring to Fig. 2 of the accompanying drawings, there is illustrated a schematic block diagram of an open loop armature position control circuit for controlling the armature in one coordinate direction.

For the universal control of a glyph armature along three coordinates within a glyph container, three circuitries, such as shown in Fig. 2 are used, each controlling the armature movements along one axis.

The circuitry of Fig. 2 comprises the glyph container 2, the armature 5 and the field coils 68 and 69 represented schematically and described in connection with Fig. 1 as 23 and 24, and the phenomena detectors 53A also described in Fig. 1 as SX, SY or SZ, a phase sensitive amplifier 37 for translating phenomena detector signals into power for the control fields, a reference phase shifter 52 providing the phase reference for the phase sensitive amplifier 37, and a manual control signal source 54 illustrated in Fig. 2a. The manual controls may be conventional potentiometers, one for each coordinate axis, or they may be joined in one three-dimensional potentiometer. In the vertical axis the manual control may optionally include gravity compensation means for additional vertical armature control.

The armature positioning control is accomplished by means of the control of repulsive electrical forces from the three pairs of field coils 68 and 69 one pair for each of the axes, the coils of each pair being $x$, $y$ and $z$, for reasons of stability of armature control, of opposed electrical polarity.

As previously pointed out, a conductive body may be suspended in a given position in space for instance by means of aligned A.C. energized electromagnets of like polarity. The same structure may be utilized to move the conductive armature. If the current supplied to only one of two aligned coils is increased, the null point of the fields between the coils is shifted and the armature is subjected to a net repulsive force which moves it to the new null point. Thus by appropriate control of the currents to the various coils the conductive armature may be positioned anywhere within the volume defined by the housing 2. This position of the armature represents the electromagnetic vector value of the currents applied.

The phase-sensitive amplifier schematic circuit diagram shown in Fig. 2a is a source of power to a pair of opposed coil fields by a push-pull output. While the illustrated amplifier circuit is shown for the control of the armature movements along one horizontal axis it is representative of the two identical circuits needed to control movements of the armature 5 along the two horizontal axes, X, and Y. A modification of the circuit consisting of a short circuit between two points "A" of Fig. 2a and the elimination of field coil 68 and of components 66, 70, 71, 72 will accomplish the energization of the single coil to achieve stable armature position in the vertical axis. It is noted that the repulsive force of the single field coil 69 of this modified circuit of Fig. 2a is at all times balanced by the gravity acting on the armature. In event that the use of gravity as a restoring force is not feasible, the vertical axis can be controlled by an opposed two-coil arrangement identical to that of the horizontal axes described.

The operation of this open loop control block-diagram is more fully hereinafter described in the description of the electronic circuit diagram of the amplifier of Fig. 2a. An A.C. power source 51 supplies current at the frequency of the armature control field to the phase sensitive amplifier 37, which has two inputs: the phase shifter 52 and the signal phase 53A. The signal phase 53A optionally may be modified by an additional signal source, such as a signal source 54, generated manually or otherwise for the purpose of gravity compensation, time indication, etc. The reference phase transformer 55 supplies power for the 2 halves 56 and 57 of the push-pull amplifier with coupling resistors 58 and 59, respectively, each to the grid of a push-pull amplifier tube, shown as a triode 60 and 61 respectively. The signal phase transformer 62 is connected between the center junction of the phase splitting windings 56 and 57 of the reference phase-transformer 55 and the common junction of the cathode of the push-pull tubes 60 and 61.

The plate circuit loading of the push-pull tubes 60 and 61 is accomplished by means of two diode rectifiers 63 and 64 respectively. The common junction of the diode-rectifiers is coupled to the common cathode connection of the push-pull tubes by means of resistor 65. The push-pull triode plate power is supplied through condensers 66 and 67 respectively to control field coils 68 and 69 respectively, which are in series opposition.

In the various subsequent figures the coils are respectively designated as 68 and 69, subscript x, y or z to conform to their respective axes. The return circuit is completed with the power potentiometer 70, the sliding contact of which, 71, makes connections with the common junction of the two rectifier diodes 63 and 64. The setting of the slider 71 of potentiometer 70 is manual and effects small changes in the balance of the two opposed field coils to compensate for deficiencies in the balance of the coils for mechanical reasons, or for unbalances or undesirable changes in the balance of the push-pull stages of the amplifier. This is a setting made preliminary to the operation of the apparatus and normally does not have to be changed during the operation.

The container 2 is interposed between the coils in a fixed position relative to them. The armature 5 is shown within the container. Additional stages of amplification within the phase sensitive amplifier for higher power requirements may be interposed as indicated by dotted lines 73.

Three-dimensional control of the armature by means of the series opposed field coils in each of the three axes, as exemplified in Fig. 6 requires three such amplifiers as described above.

Fig. 3 shows a circuit controlling the power applied to the field coils to control the position of the armature in the transverse "X" axis and a dual photocell armature follow-up system in the fore and aft, "Y" axis. Two additional identical circuits one for each axis are necessary for control of the armature in space to cause variations in its position in 3 axes according to given input signals. Additional means are provided accurately to sense the armature movements and means are described hereinafter to effect stabilization and other performance improvements. A mechanical system motivates the armature-position optical sensing-carriage 80 along a lead-screw 81 in accordance with the motions of a servo-motor 82 in response to signals from a phenomena-detector 53B, described as Sx, Sz and Sy in Fig. 1.

Whenever the position of the armature changes, its movements are sensed by a system comprising a light source 83, energized by battery 84 with suitable collimating means 85 to project the shadow of the armature upon a dual photocell system 86x and 87x which is mounted on the optical carriage 80 to sense the position of the armature in the "X" directions. The motions of the optical carriage are transferred to a wiper 88 sliding on potentiometer 89, which is energized by a voltage source 90. The carriage position signal is electrically connected to the phenomena detector input of the servo-motor in opposition to the signal of the phenomena detector. Thus the follow-up means cause precise movements of the optical carriage 80 in response to the signals of the phenomena detector 53B.

The signals from the photo-cells may be carried to the electrical bridge-circuit 91 by conventional means such as slip rings, sliding contacts or flexible leads, or the bridge circuit may be mounted directly on the carriage. The photo-cells are energized by batteries 94 and 95. The unbalanced output of the dual photo-cells resulting from relative movements of the armature causes an unbalance in the electrical bridge 91 between bridge terminal 92 and bridge-reference point 93. The signal thus generated is an electrical representation of the motion of the armature relative to the follow-up carriage, its magnitude proportional to the movement and the phase indicating direction. The said signal is applied to the phase sensitive amplifier 37, described and shown in Fig. 2a as the signal input 53A. The output of the amplifier 37 is fed through control field 68x and 69x to effect the motion of the armature to its balanced position with respect to the dual photo-cells 86x and 87x. Thus the armature follows the movements of the optical carriage 80 as it moves in response to the servo-motor which in turn follows the phenomena detector signal 53B. As the armature in Fig. 3 follows the phenomena detector signals 53B, the input signal 53A to the phase sensitive amplifier will be nulled since the dual photo-cell output is balanced.

A follow-up system described in Figure 4 which eliminates the mechanical movements of the mechanical optical carriage and servo of Fig. 3 may be preferable in order to follow rapid variations of the input signal.

Instead of a conductive armature 5, as an alternative, a highly permeable armature may be employed. Thus, a magnetic means for positioning the armature between electro-magnetic coils, may be substituted for the electro-magnetic induction means. Without follow-up means, such positioning would have a tendency to be unstable, and optionally therefore a follow-up means such as the photo-cell system of Fig. 3 may be utilized. By careful attention to the viscosity of the glyph carrier, a damping function of the armature supporting fluid may be obtained and by exercise of manual or other type controls 54 the stability of the armature may be satisfactorily controlled. The coils are energized with an A.C. current of a magnitude and frequency determined by considerations of the optimum armature-mass, the fluid viscosity, the amount of force required to overcome friction to propel the armature within the record carrier in response to phenomena signals, and the amount of induction heating which can be tolerated.

The armature may be a particle of small dimensions ranging from an approximation to an artificial molecule of a diameter of 1.000 Angstrom or less up to a radius of an inch or more. The upper limitation on the size of the armature is determined by the amount of the current available for the supporting field and by the heating effect of the induced currents.

In Fig. 4 the mechanical servo-driven optical carriage 80 of Fig. 3 is replaced by a direct input signal of the phenomena detector 53B into the dual photo-cell bridge circuit 91 by means of a shunting resistor 96 across one leg of bridge 91 so that one of its terminals is in common with terminal 93 of the reference side of the bridge. Movements of the armature in response to the control fields 68 and 69, as determined by the phase-sensitive amplifier 37, on the output of the photo-cell bridge 91 optically unbalance the photocells in such a manner as to restore balance to the photo-cell bridge.

In operation, when the armature is in a stable position in response to a signal from the phenomena detector 53B, the unbalance to the bridge caused by this signal is compensated by the unbalance from the dual photo-cell. In a simple form of photocell detector in which the photocells operate on direct current, the phenomena-detector, must deliver a D.C. signal to the bridge circuit. Converter 97 converts the D.C. bridge output to the audio-frequency of the armature control coils, to operate the phase-sensitive amplifier 37 as previously described. The remaining mechanical constructional and optical features of Fig. 4 are identical to those of like numbered features of Fig. 3.

The schematic of Fig. 4 illustrates a dual photo-cell which will accomplish the movement-control over a central, limited range. A conventional elaboration of the dual photo-cell principles to a plurality of photo-cells will allow any desired extension of the controlling range.

Figure 5:
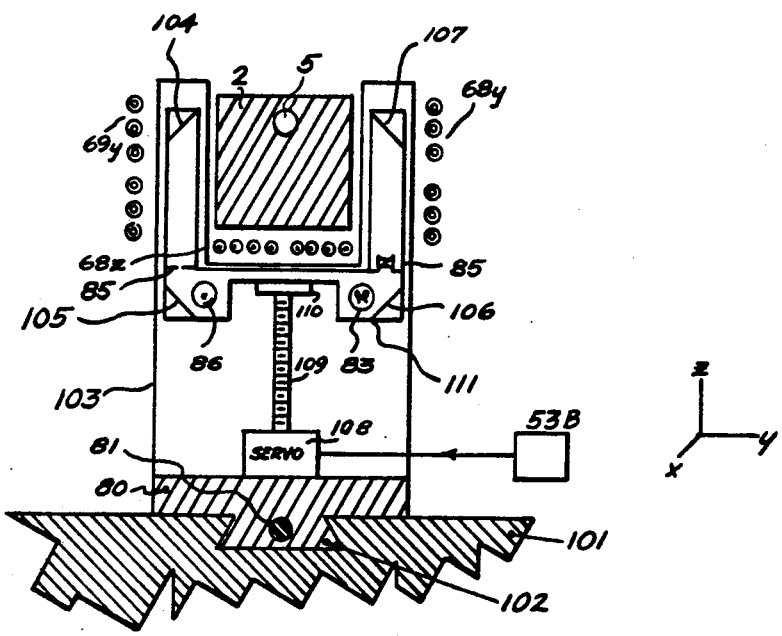
Fig. 5 is a vertical cross-section through container, armature and apparatus along lines 5—5 of Fig. 6.

Before going into description of Figures 5 and 6 the following functions and terminology are now identified. The principle of follow-up or closed-loop servo-mechanism is employed to insure a high degree of linearity and precision in the positioning of the armature according to the signal from phenomena detectors. Each phenomena detector drives its respective servo to position an optical carriage in direct and proportional response to the phenomena signals.

Fig. 5 is a schematic vertical cross-sectional view through container, armature and apparatus, along the lines 5—5 of Fig. 6, showing mechanical details of the optical carriage and photocell systems for controlling the armature movements along the Y and Z axes.

The glyph housing 2 is supported in space, by conventional mechanical means not illustrated, and is positioned within an optical carriage 111. The optical carriage 111 is supported for movement in three coordinate directions. The movement of the optical carriage 111 in the X axis is accomplished by rotating lead screw 81 which drives slider 80 that is dovetailed at 102 to the carriage bed 101. In the same manner the carriage bed 101 may be provided with a dovetail which mates with the base of the apparatus and is driven by lead screw to provide movement along the Y-axis. Movement of the carriage along the Z axis is accomplished by means of a lead screw 109 which extends between a servo-motor 108 supported on slider 80 and a fixed threaded member 110 secured to the optical carriage 111. Thus the optical carriage may be moved in three coordinate directions with respect to the housing 2. Movement of the armature 5 in three directions with respect to the housing 2 is accomplished by coils 88X—89X, 88Y—89Y and 68Z. Thus Fig. 5 illustrates a physical embodiment of the apparatus of Fig. 3. A vertical guide 103 is provided for the scanning photocell system to keep the scanning along the X axis at the changeable vertical elevation of the armature. The optical follow-up system comprises photocell mirrors 104 and 105, and light source mirrors 106 and 107. A servo motor 108 elevates the optical carriage 111 along the Z axis driving the vertical lead screw 109 provided with vertical lead screw nut 110. 111 is the vertical portion of the carriage of the X axis sensing system. The light from light source 83 reflected from mirrors 106, collimated by slit and lenses 85 reflects through 107, 104 and 105 to a dual photocell of which one photocell 86 only is visible.

In Fig. 3 only one pair of photocells is employed to sense the armature motion along the X axis. In Fig. 5 the x and z follow-up system employs two pairs of dual photocells arranged as shown in detail in Fig. 5a, to sense the armature movements along the x and z axes simultaneously.

There are three pairs of photocells necessary regardless of whether a five coil or a six coil system is employed. Fig. 5 thus remains the same in either case.

Figure 5A:
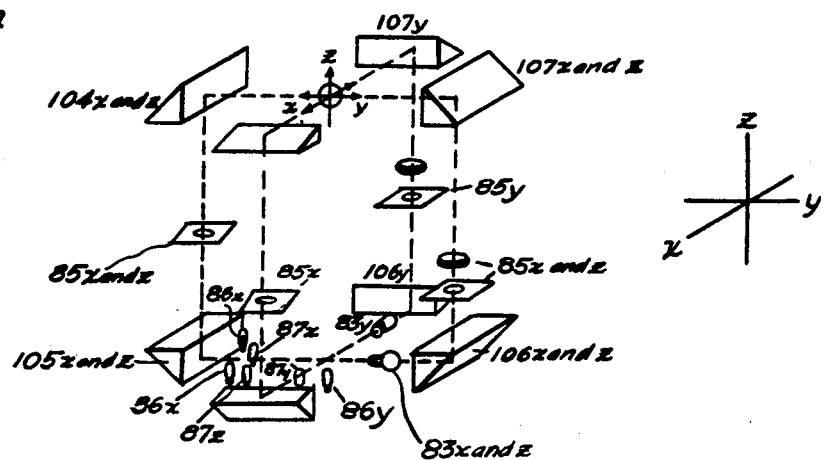
Fig. 5a is a detail perspective of portions of Fig. 5.

Fig. 5a is a detail of the 3 pairs of dual photocell systems for scanning along the three axes of armature motion. This figure supplements Fig. 5 to illustrate the two optical projection systems which resolve the motion of the armature into its components with respect to the three reference axes. The armature motion along the Y axis is sensed by photocells 86Y and 87Y along the light path whose components have Y designations, namely the light source 83Y, mirrors 106Y, 107Y, 104Y and 105Y and collimation slits and lenses 85Y. The optical sensing in the X and Z axes is identical to the above Y axis description with the common optical elements 106, 107, 104, 105 and 84 having the joint X and Z designations. A single beam of light propagated from light source 83x, and Z is resolved into the X and Z compounds by the two sets of photocells with the X and Z designation respectively, which are positioned as shown to sense light or shadow in their respective axes only and independently.

Fig. 6 is a perspective view with portions broken away of a model of a glyph-container housing, which is fixed with respect to its field coils. Thus it differs from the species shown in Fig. 1. The apparatus here is constructed with the intention of using it for either recording or representation. To make observation possible, and to provide access for inspection and removal of the container 5 the top coil is eliminated. It is, of course, feasible for recording purposes to include a top coil.

The outer frame 112 shown cut away, supports the stationary portions of the apparatus. If the top vertical axis coil is eliminated circuitry of Fig. 2 will be used by shortcircuiting connections A—A, with the result that components 66, 68, 70—72 will become inoperative, and may be eliminated.

The outer frame is shown supported in a gymbal system 113 which is optional and intended only for certain applications, requiring fixed orientation of a glyph container with respect to inertial space or other axes of reference.

The vertical coil 68Z shown in Fig. 5, in Fig. 6 is positioned between the vertical optical carriage housing 103 and the container 2 and is hidden from view in this perspective. The movable optical carriages 103 for the X axis and 114 for the Y axis provide motion in the two horizontal orthogonal directions.

Fig. 6 without top coil as shown may serve as a device for a three dimensional display of the relative position of a controlled object with respect to a 3 dimensional frame of reference relative to the fixed container, or relative to fixed points in proximity to the control device in a three dimensional configuration.

Figure 7:
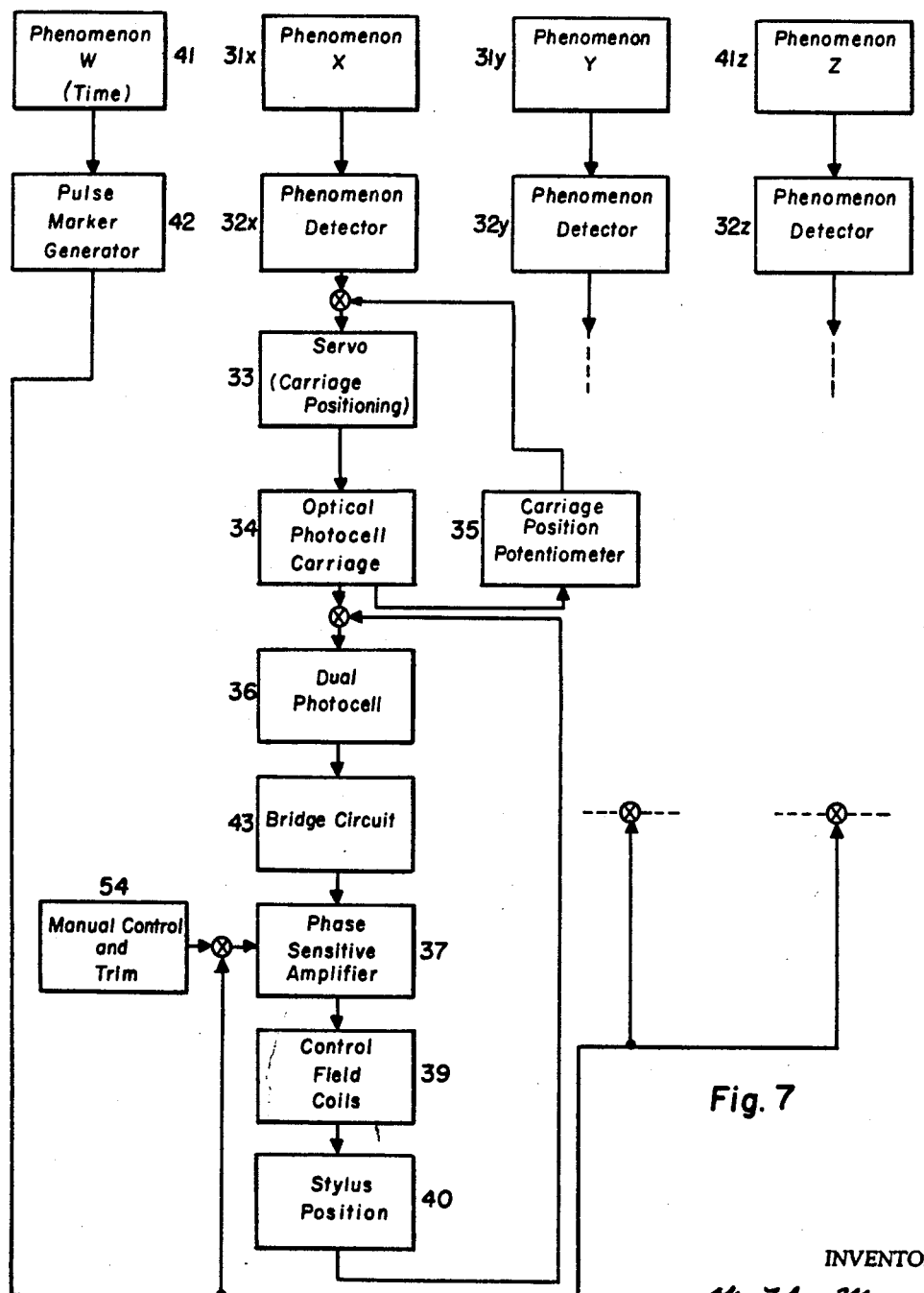
Fig. 7 is a block diagram of the method and apparatus described in Figs. 2, 3, 5 and 6.

Fig. 7 is a schematic block diagram of the method of universally moving a body in the glyph container space. The method is shown in Fig. 3 and is described with reference to it for one representative "x" axis. For three-dimensional representation of phenomena whether they have a true spatial significance or whether they are purely analytical functions, the phenomena are resolved into three principal components with respect to any coordinate system selected shown here as X, Y and Z in blocks 31x, 31y and 31z. These respective components are reduced to electrical quantities respectively by phenomena detectors 32x, y and z. A time, distance, or other function reference 41 converted into electrical quantities by a pulse marker generator 42 or other means may be introduced simultaneously into any or all of the three x, y, z phenomena signal systems. The schematic block diagrams of the y and z components conform to that of the x components illustrated in detail. The coordinate system is referenced by corresponding frames of reference appended to the glyph container housing or container itself.

The optical carriage position potentiometer 35 senses how far the optical system carriage has moved in response to the servo movement and was described in Fig. 3 above as 88, 89 and 90.

The servo 33 moves the optical system carriage 34 in response to signals from the "x" phenomena detector 32 until the signal developed by potentiometer 35 equals in opposition the voltage from the phenomena detector 32.

The movement of the optical carriage 34 changes the signal from the dual photoelectric position sensor, 36. This signal is fed to the phase sensitive amplifier 37 subject to manual control setting which in Fig. 2a is the reference phase shifter 52 of amplifier 37.

The output of amplifier 37 is the high frequency current which is fed to armature control field 39 shown schematically in Figs. 2, 3 and 4 as coils 68 and 69. The armature position represented in Fig. 7 as block 40 rebalances the dual photocell circuit 36.

Figure 8:
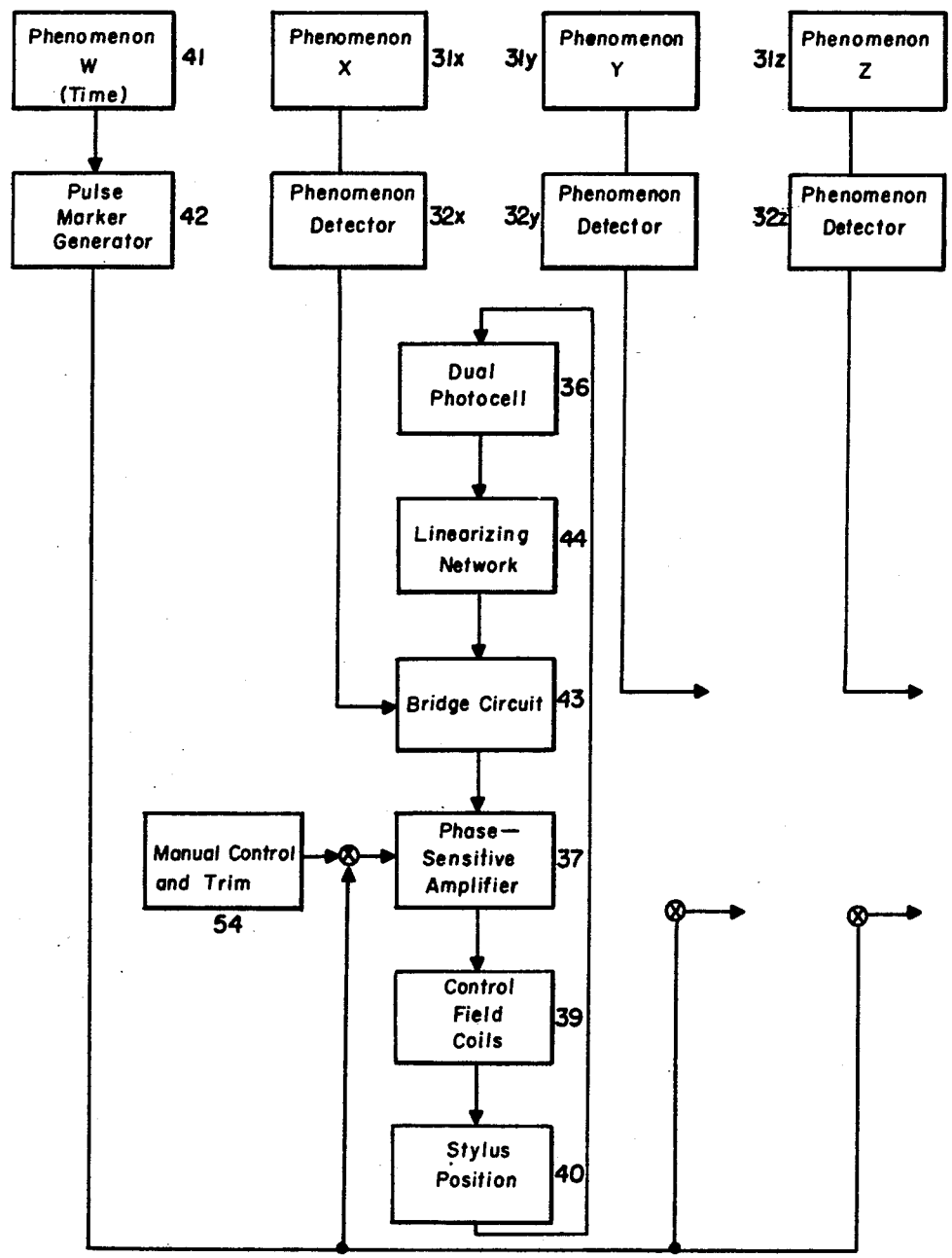
Fig. 8 is a block diagram of method and apparatus of Figs. 2 and 4.

Fig. 8 is a schematic block-diagram of Fig. 4, showing a three-axis automatic follow-up armature positioning system with an electronic input.

In the description of the circuitry of Figure 7 the armature follows the mechanical movements of the optical carriage. In Fig. 8 the armature position is controlled by the balance between the dual photo cells 36 as their output is fed electrically into the bridge circuit 43. The phenomena detector signal which unbalances bridge circuit 43 is rebalanced again in the bridge 43 by an unbalance of the dual photocell output. An additional linearizing network 44 is shown between the dual photocells 36 and the bridge circuit 43 to compensate for an expected non-linearity of the photocells in following the wide range movements of the armature. The advantage of this version of the follow-up circuit is the elimination of the mechanical moving parts in the servo-response loop. All other numbered elements of Figure 8 correspond to and perform the identical function of elements described in Figure 7.

Principles of operation

The principle of operation of this invention has been demonstrated by the employment of a source of alternating current to electro-magnetic field coils, the fields of which position an electro-conductive body acting as a shortcircuited coil by virtue of the currents which are electromagnetically-induced in the body by the three pairs of coils, each pair acting independently.

In Figs. 3, 5, 6, 7, the armature follows the optical balance point of dual photocells, which effect control of the armature movements. The phenomena detector actuates a servo which positions the optical photocell carriage. The movement of the carriage relative to the armature causes an unbalance of the carriage-mounted photocell system which unbalance is amplified to supply power to the control fields coils with such polarity as to cause the armature to move relative to the photocells to return them to their original balance position with respect to the photocells as the photocells move in conjunction with the carriage.

The optical carriage and photocell systems which are provided one for each axis scan the armature in the single axis in which it moves. Thus the x, y and z axes follow-up mechanisms scan in the x, y and z axes respectively.

In Figs. 4 and 8 the moving optical carriage is eliminated. Instead of rebalancing the optical dual photocell system the armature unbalances the dual photocells. This unbalance is electrically fed into the bridge circuit, which was previously unbalanced by the phenomena detectors, in such a manner as to electrically rebalance the bridge. Thus a purely electrical follow-up system effects a stable armature position in response to a varying signal input.

While the invention is carried out for three-axis motor control of the armature, it is obvious that by eliminating one or two axis control the armature may be moved in one or two coordinate axes only. This one- or two-dimensional linear motor control of the armature also is a subject matter of this invention.

The principle of electromagnetic induction may be replaced by one of electromagnetic attraction of a magnetic or electro-static type. In this case electromagnets or electro-static deflection plates may be substituted for the inductive coils 68 and 69. The remainder of the circuit is not changed from that shown in Figs. 2a, 3, 4, 7 and 8, except for a D.C. or A.C. power supply with current-limiting and current-adjusting resistors and an associated high current or voltage source for the limiting and motivating fields. The propulsion of the body may be accomplished also by high frequency sound radiations.

The present specification describes examples of an independent invention for the purposes here disclosed. It is however, intended to cover all changes and modifications of the embodiments shown, and all combinations of the present invention with those disclosed in the above cited copending patent applications, which do not depart from the spirit and scope of the invention as claimed.

The following definitions are made for purposes of interpretation of the claims.

A field defines a space or sphere of operation of a force, such as magnetic, electro-magnetic, electro-static, and buoyant.

Force defines the cause that produces changes in motion of the body of the present invention, such as magnetic, electro-magnetic, electro-static and buoyant means.

Force-field defines the occurrence of one of the above-mentioned forces within its respective field.

Force-field responsive body defines the body of the present invention capable to be moved or stopped from movement by the above-defined forces in the above-defined fields.

Force-field means defines means capable of producing one of the above forces within their fields.

I claim:

1. An apparatus for linear motor controls of a body in three coordinate directions comprising a container, a field-force responsive body positioned within said container, said container defining a space permitting three-dimensional movements of said body within it in three-coordinate directions, first, second and third field-force means to exercise linear motor control over movements of said body, each in one coordinate direction respectively, independently from the other two said means, in response to variable field-force actuations of each said field-force.

2. An apparatus as claimed in claim 1, wherein said body comprises an electro-conductive short circuited coil means and wherein at least one of said first, second and third field-force means to exercise linear motor control over said body are electro-magnetic induction coils, acting upon said body by repulsion.

3. An apparatus as claimed in claim 1, wherein said body comprises a magnetically permeable mass and wherein at least one of said first, second and third means to exercise said linear motor control over said body are magnetic means.

4. An apparatus as claimed in claim 1, wherein said body comprises a magnetically permeable mass and wherein at least one of said first, second and third means to exercise linear motor control over said body are electro-magnets.

5. An apparatus as claimed in claim 1, wherein at least one of said first, second and third means to exercise linear motor control over said body are electro-static deflection plates and wherein said body comprises a dielectric.

6. An apparatus for linear motor control of movements of a freely movable force-field responsive body comprising a housing, field-force means for suspending said body within said housing for three-dimensional movements therein, said means including a first, a second and a third field-force means for generating mutually perpendicular variable magnitudes force fields, and means for varying the magnitudes of the respective said force fields to control the movements of said body within said housing.

7. An apparatus in accordance with claim 6 wherein at least one of said means for generating variable magnitude force fields comprises two aligned field sources positioned at opposite sides of said housing and producing fields of like polarity in said housing between said field sources.

8. An apparatus for providing three-dimensional body movement comprising an enclosure, a freely movable force-field responsive body positioned within said enclosure, means for suspending said body freely in space within said enclosure and electro-magnetic means for producing selective three-dimensional relative movements between said body and said enclosure.

9. An apparatus for linear motor controls of a body in three dimensions, comprising a container, an electro-conductive body positioned within said container, said container defining a space permitting three-axis movements of said body therein, three pairs of electro-magnetic field coils, spaced along the circumference of said container, each said pair being aligned along a common axis perpendicular to the axes of the other two said pairs, the coils of each said pair being positioned on opposite sides of said container in parallel planes, and being wound in the same along the common axis, and connected in series opposition to generate two fields of like polarity within said container, at least three sources of current, at least one said source connected to each said pair of said coils, so that the said body is fixed by repulsion at an electro-magnetic field null between said coils of each of said three pairs, and means to vary the relative magnitudes of said source of said currents to each said pair of said coils respectively to produce variable movements of said body relative to said container.

10. An apparatus for linear motor controls of a body in three coordinate directions comprising a container, an electro-conductive body positioned within said container, said container defining a space permitting three axis movements of said body within it, two pairs of electromagnetic field coils aligned along the vertical circumference of said container, the said coils of each of said pair being spaced along a common axis perpendicular to that of the other said pair and spaced on opposite sides of said container, the coils of each said pair of coils being connected in series opposition to generate two fields of like polarity therebetween, a single electro-conductive field-coil positioned below said container concentrically with the vertical axis of said container, an alternating current source of electromagnetic energy connected to said two pairs of said coils to maintain said body by repulsion between said two pairs of said coils at an electromagnetic field null and an alternating source of electromagnetic energy connected to said single coil of a magnitude to produce a repulsion force equal to the unbuoyed weight of said body to support said body.

11. An apparatus as claimed in claim 10, wherein said two pairs of coils and said single coil are fixed in space, means for moving said container between said coils and relative to them in three coordinate directions and in each said direction independently of movements in the other coordinate directions, and electric signal responsive means for controlling said means for moving.

12. An apparatus as claimed in claim 10 comprising means for independently varying the relative magnitudes of the alternating currents supplied to each of said pairs of coils and to said single coil for moving said body with respect to said container.

13. An apparatus as claimed in claim 12, wherein said means for independently varying each of the said relative magnitudes comprises a source of reference phase voltage, means for generating a voltage, the phase of which varies in accordance with a variable signal and phase comparison means for varying the relative energization of the coils of one of said pairs of coils in accordance with the relative phase of said voltages.

14. In an apparatus for display, representation, recording and other work performance by means of a conductive levitating body suspended in a spatial volume defined by a container and by the effective areas of electro-magnetic control fields therein, means for three-dimensional electromotive control of linear movements of said body within said container and relative to it comprising in combination first, second and third electrical coil means, one for each coordinate axis, said coil means spaced along the circumference of said container to establish, when energized, electro-magnetic control fields within said container, first, second and third control means, one for each coordinate axis, connected to said first, second and third coil means to variably energize each of them respectively, to move said body within said container, one of said coil means supporting said body in levitation at a predetermined level in said container, prepositioning means connected with said control means to energize said first, second and third coil means to establish an initial position of said body within said container, photoelectric body position sensing means for generating electrical signals indicative of the position of said body within said container, amplifier means connected to compare the said signals with variable information signals and feedback means for controlling said control means to vary the energization of said coil means to thereby move said body.

15. An apparatus as claimed in claim 14 further comprising one body position sensing means for each coordinate axis, each said sensing means including photo-electric means for producing error control signals of intensities varying in accordance with the position of said body with respect to said photoelectric means and means for differentially varying the current applied to the said respective coils in accordance with said error control signals.

16. An apparatus as claimed in claim 15 further comprising means for producing relative movements along each coordinate axis between said photoelectric means and said enclosure for selectively establishing the position of said body within said enclosure.

17. An apparatus as in claim 15, wherein each of said photo-electric means comprises a plurality of photo-electric cells, disposed along one side of said container, a light source disposed on an opposite side of said container and means for producing an output voltage, the amplitude of which is determined by the position of said body between said source and said photocells.

18. An apparatus as claimed in claim 10 further comprising a plurality of intelligence receivers and means for controlling the current to said coils in accordance with variable signals generated by said receivers.

19. A method for suspension of and control of movements of a body in three dimensions in a spatial volume defined by a housing positioned within the effective areas of linear motor control fields in three coordinate axes comprising the steps of placing said body within said housing, of imparting to said body within said housing a neutral buoyancy to cause its levitation, of generating linear motor forces, at least one for each coordinate axis, within said housing to actuate said control fields to fix the position of said body at a desired point, to vary the relative intensities of said linear motor forces for each coordinate axis independently to cause variable linear movements of said body relative to said housing.

20. An apparatus for providing linear motor control of movements of a body in at least two coordinate directions, comprising an enclosure, a freely movable force-field responsive body within said enclosure, means to produce at least one force-field vertically supporting said body within said enclosure against gravity, at least two spaced variable force-field means exerting directional forces for producing at least one variable vector force in at least two coordinate axes to position said body within said enclosure relative to said force-field means and means to displace said body relative to said enclosure in response to said at least two simultaneously applied force-fields to produce selectively controlled movements between said body and said enclosure in at least two coordinate axes.

21. An apparatus as claimed in claim 20, said means to displace said body relative to said enclosure comprising at least two force-field means moving said enclosure relative to said body positioned by force-field means in at least two coordinate axes.

22. An apparatus as claimed in claim 20, said at least two variable force-field means comprising said means to displace said body relative to said enclosure, said enclosure being fixed in space relative to said force-field means.

22. An apparatus as claimed in claim 20, said at least two variable force-field means comprising said means to displace said body relative to said enclosure, said enclosure being fixed in space relative to said force-field means.

References Cited in the file of this patent

UNITED STATES PATENTS

| 1,595,801 | McDonald | Aug. 10, 1926 |
| 1,851,774 | Rogers | Mar. 29, 1932 |

OTHER REFERENCES

Journal of Applied Physics, vol. 23, No. 5, May 1952, pp. 545, 552.